Oct. 31, 1939.   C. D. STEWART   2,177,956
BRAKE MECHANISM
Filed Dec. 20, 1938   2 Sheets-Sheet 2
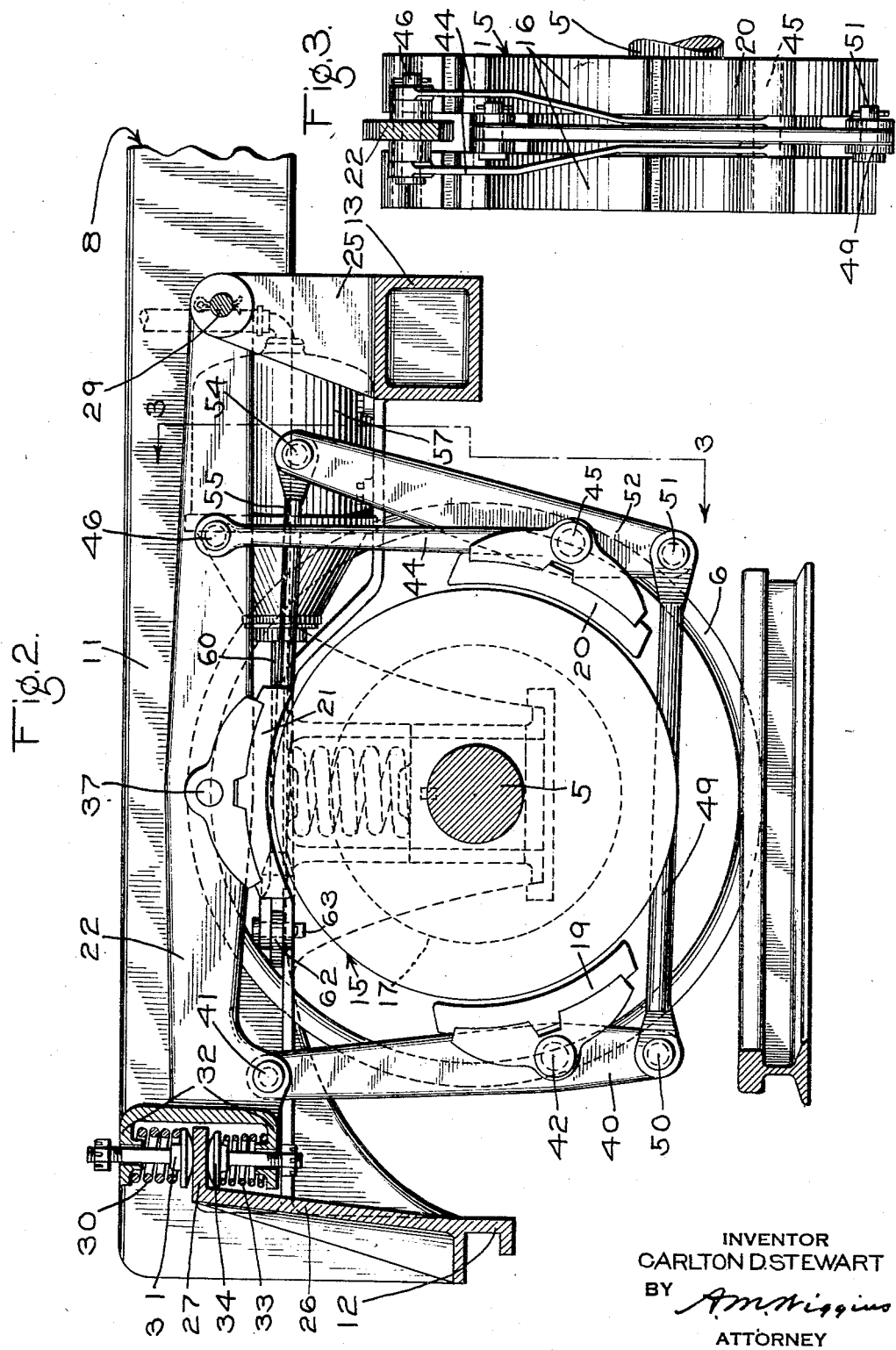
INVENTOR
CARLTON D. STEWART
BY *A. M. Wiggins*
ATTORNEY Patented Oct. 31, 1939

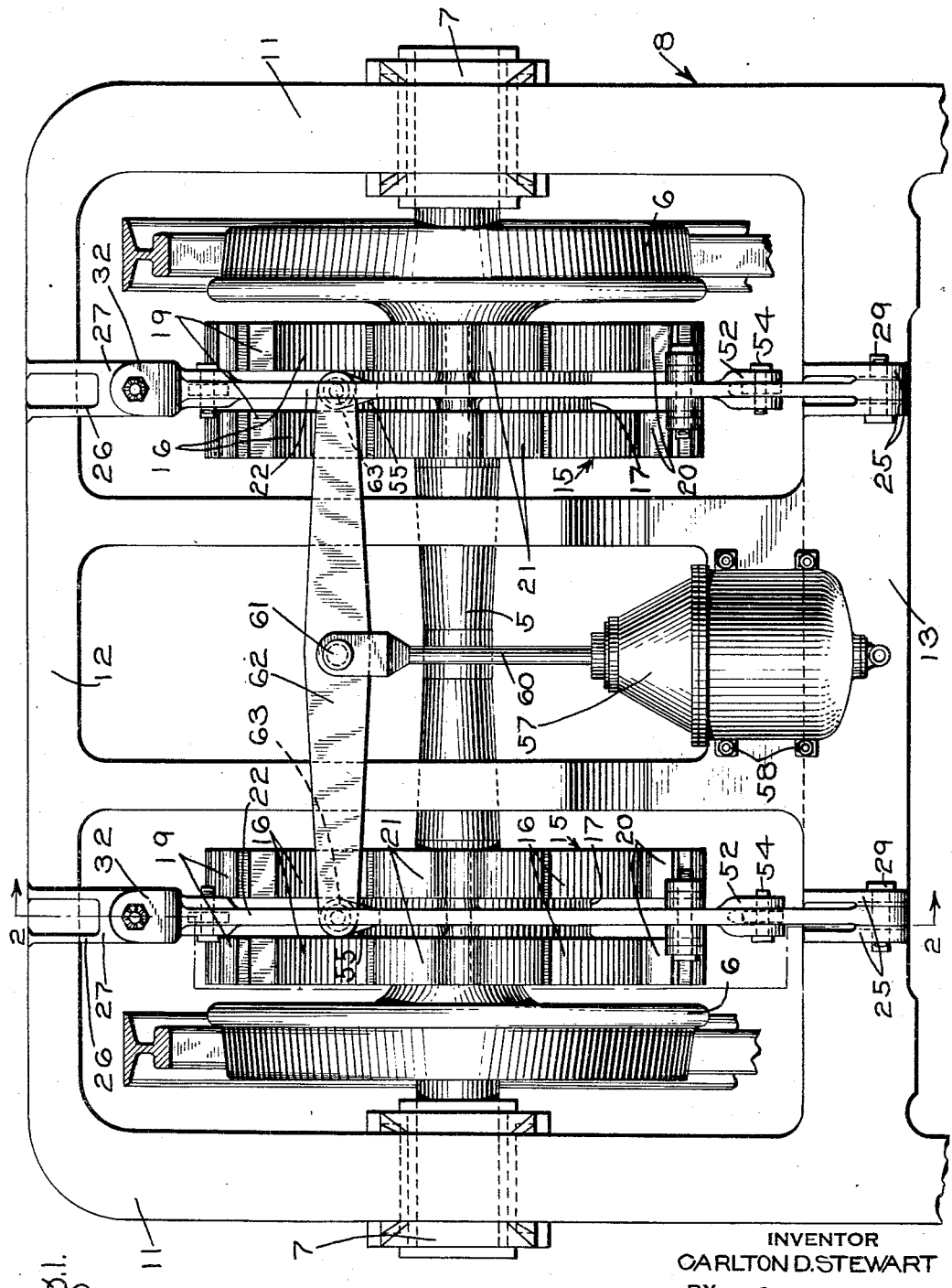

2,177,956

UNITED STATES PATENT OFFICE 2,177,956

BRAKE MECHANISM

Carlton D. Stewart, Wilkinsburg, Pa., assignor to The Westinghouse Air Brake Company, Wilmerding, Pa., a corporation of Pennsylvania Application December 20, 1938, Serial No. 246,824

5 Claims. (Cl. 188—58)

This invention relates to clasp brakes for railway trucks, and more particularly to a clasp brake mechanism of the type embodying a brake drum and a plurality of brake shoes engageable therewith and supported by a carrier member or the like which is adapted to prevent excessive braking forces from being transmitted to the truck frame and springs.

In my copending application for a patent on a brake mechanism filed in the U. S. Patent Office June 18, 1938, Serial No. 214,517, there is disclosed an improved clasp brake equipment of the above type in which a longitudinally disposed carrier member is resiliently supported by the truck frame and is operatively connected to a brake shoe aligned with the top of the brake drum and to a pair of similar shoes disposed at each side of the drum below the center thereof, which shoes are movable into engagement with the drum by suitable operating means in such a manner that the drag and displacement of the lower pair of brake shoes are utilized to effect application of the top shoe, which thus constitutes a supporting means preventing transmission of the braking forces to the truck frame and possible overloading of the truck springs.

The principal object of the present invention is to provide a drum brake mechanism of the clasp type as above explained mounted inboard of each wheel of a wheel and axle assembly, and a common brake cylinder means mounted on the truck intermediate the two drum brake mechanisms and operative to actuate both mechanisms simultaneously and with equal force.

Other objects and advantages of the invention will be apparent in the following description thereof taken in connection with the accompanying drawings, wherein Fig. 1 is a fragmentary plan view of a wheel and axle assembly and the associated end portion of the frame of a railway truck equipped with a drum brake mechanism constructed in accordance with the invention;

Fig. 2 is an elevational view, mainly in section and taken substantially along the line 2—2 of Fig. 1; and Fig. 3 is a sectional view taken substantially along the line 3—3 of Fig. 2.

Referring to Fig. 1 of the drawings, the railway truck includes a wheel and axle assembly comprising an axle 5 having one of a pair of wheels 6 secured adjacent each end thereof, and terminating in bearing portions mounted in journal boxes 7 which are adapted to support the truck frame 8 through the medium of the usual truck springs. The frame 8 may be of any suitable construction, and as shown in the drawings comprises side portions 11 and a plurality of transversely disposed portions including an end piece 12 and a transom 13.

Secured to the axle 5 adjacent each of the wheels 6 is a brake drum 15 having a pair of annular braking surfaces 16 formed thereon and separated by an annular groove 17. Associated with each of the brake drums 15 is a clasp brake mechanism which, referring to a single mechanism as shown in Fig. 2 for convenience for describing features common to all, comprises three pairs of brake shoes 19, 20 and 21, cooperatively supported by a carrier member 15 or lever 22.

As shown in Fig. 1 of the drawings, spaced lugs 25 are formed integrally with or mounted on the transom 13 of the truck frame in longitudinal alignment with the brake drum 15 inboard of the adjacent wheel 6.

Similarly disposed on the end piece 12 of the truck frame on the opposite side of the brake drum 15 is a bracket 26 having a substantially horizontal flange portion 27 as is best shown in Fig. 2. The carrier member 22 is disposed longitudinally of the truck frame and has the inner ends thereof pivotally connected by means of a pin 29 to the lugs 25 carried by the transom, and is yieldingly supported at the outer end by means of a coil spring 30, which is interposed between a plunger 31 engaging the flange portion 27 of the frame and the upper of a pair of vertically spaced spring seats 32 formed on the carrier member. For limiting upward movement of the carrier member 22, a spring 33 is interposed between the lower spring seat 32 and a plunger 34 which is adapted to engage the under surface of the flange portion 27.

The brake shoes 21 are disposed on opposite sides of and are pivotally connected to the carrier member 22 by means of a pin 37. The brake shoes 21 are thus adapted to be lowered into braking engagement with the top surfaces of the brake drum 15, and are normally maintained in release position as shown in Fig. 2 under the supporting pressure of the coil spring 30 acting on the carrier member 22.

Both pairs of brake shoes 19 and 20 are hung in braking alignment with the drum 15 substantially below the horizontal center line thereof, and are respectively suspended from the carrier member 22 by means of a hanger lever 40, one end of which is pivotally connected by a pin 41 to the carrier member and by a pin 42 to the brake shoes 19, and a pair of hangers 44 connected by means of a pivot pin 45 to the brake shoes 20 and having their upper ends journaled on pins 46 secured to the carrier member.

A tie rod 49 is provided for operatively connecting the brake shoes 19 and 20, and has one end thereof pivotally connected by means of a pin 50 to the lowermost portion of the hanger lever 40 and the other end thereof similarly connected by a pin 51 to the lower end of a substantially vertically arranged brake lever 52, which is pivotally connected intermediate its ends to the pin 45 of the shoes 20. The upper end of the brake lever 52 is pivotally connected by means of a pin 54 to one end of a pull rod 55, which as best shown in Fig. 2 of the drawings, is preferably disposed longitudinally beneath the carrier member 22 and may extend above the brake drum 15 and within the groove 17 thereof.

As is best shown in Fig. 1 of the drawings, both clasp brake mechanisms carried by the axle assembly are adapted to be simultaneously actuated by a common operating means comprising a brake cylinder device 57, which is secured by suitable means, such as bolts 58, to a central portion of the transom 13 of the truck frame. The brake cylinder device 57 may be of any desired type, and includes a piston rod 60 adapted to be operated by the usual piston, not shown, and which rod is pivotally connected to a pin 61 that is journaled in the central portion of a transversely disposed equalizing lever 62. The outer ends of the equalizing lever 62 extend into operative alignment with the respective clasp brake mechanisms, and are each pivotally connected by means of a pin 63 to the corresponding pull rod 55.

In operation, when the usual air brake control equipment, not shown, is operated to effect supply of fluid under pressure to the brake cylinder device 57, the piston therein is actuated to move the piston rod 60 and pin 61 outwardly and thereby to operate the equalizing lever 62 for shifting the pull rods 55 of the two brake mechanisms in the same direction. Referring to Fig. 2 of the drawings, as the pull rod 55 is thus moved to the left, the brake lever 52 is actuated to effect engagement of the brake shoes 20 and 19 with the brake drum 15 with sufficient force to cause the shoes to move toward each other and consequently downwardly along the peripheral surface of the drum. The downwardly directed force under such action is effective through the medium of the hangers 44 and hanger lever 40 to pull the carrier member 22 downwardly about the pivotal connection with the stud 29 and against the opposing force of the spring 30 until the top brake shoes 21 are forced against the upper surface of the brake drum. At this time the downward movement of the carrier member and associated elements of the brake mechanism carried thereby will stop, since the member will now be rigidly supported by both the truck frame and brake drum. It will thus be seen that the three pairs of brake shoes cooperate in applying braking force to the wheel and axle assembly, while, with the carrier member 22 mainly supported through the medium of the shoes 21 by the wheel and axle assembly, transmission of resultant forces to the truck frame and possible overloading of the truck springs are substantially prevented.

When it is desired to effect the release of the brakes, the air brake control equipment is operated to discharge fluid under pressure from the brake cylinder device 57, thereby permitting release movement of the piston rod 60 and connected brake rigging element into the position shown in the drawing, while the spring 30 associated with each carrier member 32 once again becomes effective to provide resilient support for the brake elements.

From the foregoing it will be apparent that, according to the invention, an improved clasp brake equipment of the drum type has been provided for a wheel and axle assembly, including two brake drums secured to the assembly inboard of the respective wheels, a plurality of brake shoe elements carried in operative alignment with each drum independently of the truck frame, and centrally disposed operating means adapted to effect application of both sets of brake shoe elements with equal force and at the same time.

Having now described my invention, what I claim as new and desire to secure by Letters Patent, is:

1. In a clasp brake equipment for a railway truck involving a wheel and axle assembly and a frame supported thereby, the combination of two brake drums secured to said assembly adjacent and inwardly of each wheel, a brake mechanism for each drum, means carrying said mechanism movable into supporting engagement with the assembly in effecting an application of the brakes and having a torque connection with said frame for holding said mechanism against rotation with said assembly, an equalizing lever disposed transversely of said frame and operatively connected to both brake mechanisms, and operating means mounted on said frame between said brake drums and operatively connected to said equalizing lever intermediate the ends thereof.

2. In a clasp brake equipment for a railway truck involving a supporting wheel and axle assembly and a truck frame having transverse portions: the combination of brake drums mounted on said assembly adjacent and inboard of the wheels, respectively; clasp brake mechanisms for said drums individually comprising a carrier member yieldingly mounted on said frame above the drum, a brake shoe mounted thereon for engagement of the top of said drum, a pair of brake shoes hung from said carrier member for engagement with the drum below the center thereof, and brake lever means for actuating said shoes; an equalizing lever operatively connected to the brake lever means of both said clasp brake mechanisms; and a brake cylinder device carried by a transverse portion of said frame between said mechanisms for operating said equalizing lever.

3. In a brake equipment for a railway truck involving a wheel and axle assembly and a truck frame supported thereby: the combination of two brake drums mounted on said assembly adjacent and inboard of the wheels, respectively; clasp brake mechanisms for said drums individually comprising a carrier member yieldingly mounted on said frame above the drum, a brake shoe mounted on the carrier member in operative alignment with the top of said drum, a pair of brake shoes hung from said carrier member in operative alignment with and below the horizontal center line of said drum, and brake lever means for actuating said shoes; an equalizing lever disposed transversely of the frame between said mechanisms and having the opposite ends thereof operatively connected to said brake lever means beneath the corresponding carrier member of each mechanism; and a brake cylinder device secured to said frame between said brake mechanisms for operating said equalizing member.

4. In a brake equipment for a railway truck of the type including a wheel and axle assembly and a truck frame supported thereby: the combination of brake mechanisms associated with each of the wheels of said assembly and individually comprising a brake drum mounted inboard of the wheel for rotation therewith, said drum having spaced peripheral braking surfaces separated by an annular groove, a pair of brake elements operatively aligned with said braking surfaces at the top of the drum, another pair of brake elements similarly aligned with said drum below the horizontal center line thereof, a longitudinally disposed carrier member yieldingly mounted on the frame and adapted to support said pairs of brake elements, said carrier member being centrally located above said brake drum and operative in response to application of said lower pair of brake elements to said drum for lowering said top pair of brake elements into engagement therewith, brake lever means for actuating said lower pair of brake elements, and a pull rod operatively connected to said brake lever means and interposed between said carrier member and said brake drum within the groove therein; an equalizing lever operatively connected to the pull rod of each of said brake mechanisms; and a brake cylinder device mounted on the truck between said mechanisms and operatively connected to said equalizing lever.

5. In a railway truck having a wheel and axle assembly and a frame carried thereby: a brake and rigging equipment comprising two brake drums mounted on said assembly inboard of the wheels, respectively, each drum having two peripheral brake surfaces laterally spaced apart, spaced braking means associated with each of said drums and adapted to engage the respective surfaces thereof, operating rigging means connected to the braking means for each drum and individually including a substantially vertically disposed brake lever and a pull rod extending therefrom intermediate the adjacent braking means and within the space between the corresponding drum surfaces, a transversely disposed equalizing lever pivotally connected to each of said pull rods, and a brake cylinder device mounted on the truck frame and operatively connected to said equalizing lever intermediate its ends.

CARLTON D. STEWART.